United States Patent
Souche et al.

(10) Patent No.: US 10,353,906 B2
(45) Date of Patent: Jul. 16, 2019

(54) VIRTUAL ASSISTANT INTERACTIVITY PLATFORM

(71) Applicant: Accenture Global Services Limited, Dublin (IE)

(72) Inventors: Christian Souche, Cannes (FR); Davy Pallu, Mougins (FR); Richard Vidal, Antibes (FR)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 386 days.

(21) Appl. No.: 15/101,760

(22) PCT Filed: Dec. 8, 2014

(86) PCT No.: PCT/EP2014/076828
§ 371 (c)(1),
(2) Date: Jun. 3, 2016

(87) PCT Pub. No.: WO2015/086493
PCT Pub. Date: Jun. 18, 2015

(65) Prior Publication Data
US 2017/0242860 A1  Aug. 24, 2017

Related U.S. Application Data

(63) Continuation of application No. PCT/EP2014/076828, filed on Dec. 8, 2014.

(30) Foreign Application Priority Data

Dec. 9, 2013 (EP) .................................... 13306680

(51) Int. Cl.
*G06F 16/2457* (2019.01)
*G06F 16/2455* (2019.01)
(Continued)

(52) U.S. Cl.
CPC .... *G06F 16/24578* (2019.01); *G06F 16/2455* (2019.01); *G06F 16/953* (2019.01); *G06N 3/006* (2013.01); *G06N 5/043* (2013.01)

(58) Field of Classification Search
CPC ........... G06F 17/3053; G06F 17/30867; G06F 17/30864; G06F 16/24578; G06F 16/953;
(Continued)

(56) References Cited

U.S. PATENT DOCUMENTS 6,308,042 B1 * 10/2001 Marsh ...................... G09B 7/04
434/307 R
7,912,701 B1 * 3/2011 Gray ....................... G06F 17/27
704/257

(Continued)

FOREIGN PATENT DOCUMENTS

WO        2015/001048        1/2015

OTHER PUBLICATIONS

International Search Report dated Nov. 2, 2015, European Patent Application No. PCT/EP2014/076828 filed Dec. 8, 2014, European Patent Office.

(Continued)

*Primary Examiner* — Jay A Morrison
*Assistant Examiner* — Antonio J Caiado
(74) *Attorney, Agent, or Firm* — Mannava & Kang, P.C.

(57) ABSTRACT

The invention concerns a system having: a virtual assistant interactivity platform (102) including: a processing device; a memory device storing data identifying a plurality of virtual assistants, and one or more topics associated with each virtual assistant; a communication interface configured to receive an input query from a user device (104); and a memory coupled to the processing device and storing executable instructions that, when executed by the processing device, cause the processing device to: assess the input (Continued)

query to identify a subset of at least one of the virtual assistants based on a comparison between at least one topic of the query and the one or more topics associated with each virtual assistant; transmit a query based on the input query to each of the virtual assistants of the subset; evaluate answers to the input query received from the virtual assistants of the subset in order to generate a response comprising one or more of the answers; and transmit the response to the user device.

11 Claims, 4 Drawing Sheets

(51) Int. Cl.
*G06N 5/04* (2006.01)
*G06N 3/00* (2006.01)
*G06F 16/953* (2019.01)

(58) Field of Classification Search
CPC ..... G06F 16/2455; G10L 15/22; G06Q 30/02; G06N 99/005; G06N 3/006; G06N 5/043
See application file for complete search history.

(56) References Cited

U.S. PATENT DOCUMENTS

| | | | |
|---|---|---|---|
| 7,930,286 B2 | 4/2011 | Sue | |
| 8,346,563 B1* | 1/2013 | Hjelm | G10L 15/1822 379/88.01 |
| 8,825,698 B1* | 9/2014 | Gong | G06F 17/30864 707/707 |
| 9,336,269 B1* | 5/2016 | Smith | G06F 17/30864 |
| 9,424,345 B1* | 8/2016 | Sanio | G06F 17/30194 |
| 9,836,177 B2* | 12/2017 | Brown | G06F 3/048 |
| 2004/0024745 A1 | 2/2004 | Jeng et al. | |
| 2005/0246314 A1* | 11/2005 | Eder | G06N 5/022 |
| 2006/0288001 A1* | 12/2006 | Costa | G06F 17/30864 |
| 2007/0016574 A1 | 1/2007 | Carmel et al. | |
| 2007/0185843 A1* | 8/2007 | Jones | G06F 17/30864 |
| 2007/0192300 A1 | 8/2007 | Reuther et al. | |
| 2008/0261191 A1* | 10/2008 | Woolf | G06Q 50/20 434/323 |
| 2009/0165022 A1* | 6/2009 | Madsen | G06Q 10/109 719/318 |
| 2009/0183112 A1* | 7/2009 | Higgins | G06Q 30/02 715/808 |
| 2009/0235356 A1* | 9/2009 | Jensen | G06N 5/043 726/23 |
| 2010/0042603 A1* | 2/2010 | Smyros | G06F 16/338 707/711 |
| 2010/0070883 A1* | 3/2010 | Hamilton, II | G06N 5/022 715/757 |
| 2011/0270818 A1 | 11/2011 | Chowdhury | |
| 2012/0197905 A1* | 8/2012 | Kumar | G06F 17/2785 707/748 |
| 2012/0229446 A1* | 9/2012 | Hyndman | G09B 5/06 345/419 |
| 2013/0066750 A1* | 3/2013 | Siddique | G06Q 10/0637 705/27.2 |
| 2013/0174034 A1* | 7/2013 | Brown | G06F 3/048 715/708 |
| 2013/0268260 A1* | 10/2013 | Lundberg | G06F 17/28 704/8 |
| 2013/0275164 A1* | 10/2013 | Gruber | G10L 17/22 705/5 |
| 2013/0283168 A1* | 10/2013 | Brown | G06F 3/165 715/728 |
| 2014/0072221 A1* | 3/2014 | Sakai | H04N 5/23222 382/173 |
| 2014/0074454 A1* | 3/2014 | Brown | G10L 15/08 704/9 |
| 2014/0128691 A1* | 5/2014 | Olivier | A61B 5/0833 600/301 |
| 2014/0164476 A1* | 6/2014 | Thomson | G06Q 10/101 709/203 |
| 2014/0181637 A1* | 6/2014 | Eldawy | G06Q 50/01 715/234 |
| 2014/0195929 A1* | 7/2014 | Crocker | G06F 3/048 715/753 |
| 2014/0208272 A1* | 7/2014 | Vats | G06F 3/011 715/852 |
| 2014/0244712 A1* | 8/2014 | Walters | H04L 67/10 709/202 |
| 2014/0258276 A1* | 9/2014 | Fredinburg | G06F 17/30867 707/723 |
| 2014/0289231 A1* | 9/2014 | Palmert | G06F 17/30719 707/723 |
| 2014/0310005 A1* | 10/2014 | Brown | G06F 17/273 704/275 |
| 2014/0365880 A1* | 12/2014 | Bellegarda | G06F 17/2785 715/261 |
| 2015/0007037 A1* | 1/2015 | Butler | H04L 41/22 715/736 |
| 2015/0073798 A1* | 3/2015 | Karov | G10L 15/197 704/245 |
| 2015/0186497 A1* | 7/2015 | Patton | H04W 4/21 707/740 |
| 2016/0142354 A1* | 5/2016 | Whitnah | G06Q 10/10 709/205 |
| 2017/0337195 A1* | 11/2017 | Rinearson | G06F 17/30011 |
| 2018/0061261 A1* | 3/2018 | Watkins, Jr. | G09B 7/00 |

OTHER PUBLICATIONS

Amento, et al., "Does "Authority" Mean Quality? Predicting Expert Quality Ratings of Web Documents", Preoceedings of the 23rd annual International ACM Sigir Conference on Research and Development in Information Retrieval, Jan. 31, 2000, pp. 296-303, New York, USA.

Zhang, et al., "Expert Finding in a Social Network", Apr. 9, 2007, pp. 1066-1069.

El-Korany, "Integrated Expert Recommendation Model for Online Communities", International Journal of Web & Semantic Technology, vol. 4, No. 4, Oct. 31, 2013, pp. 19-29.

* cited by examiner

| I | am | looking | for | new | xyz | phone | colors | } 602 |
|---|---|---|---|---|---|---|---|---|
| 0 | 1 | 2 | 3 | 4 | 5 | 6 | 7 | } 604 |
| 3 | 1 | 4 | 2 | 5 | 8 | 7 | 6 | } 606 |
Fig 6
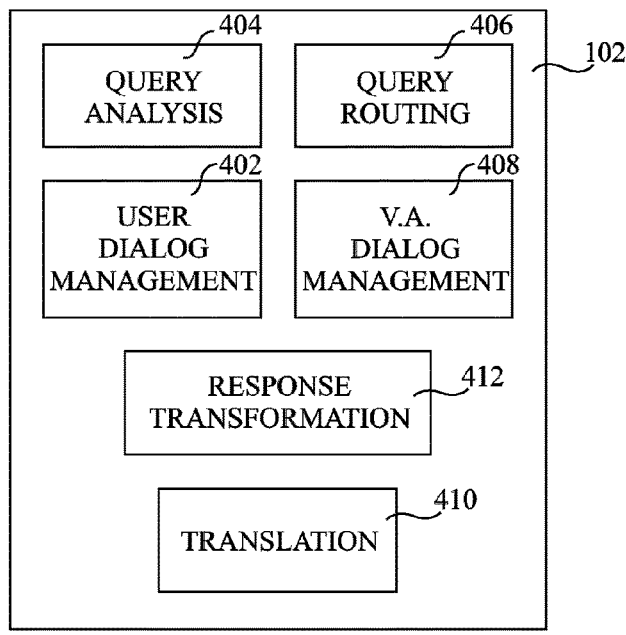
Fig 4
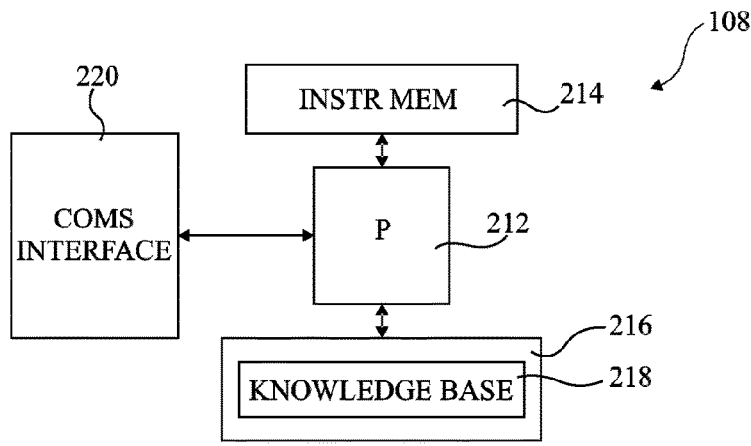
Fig 2B

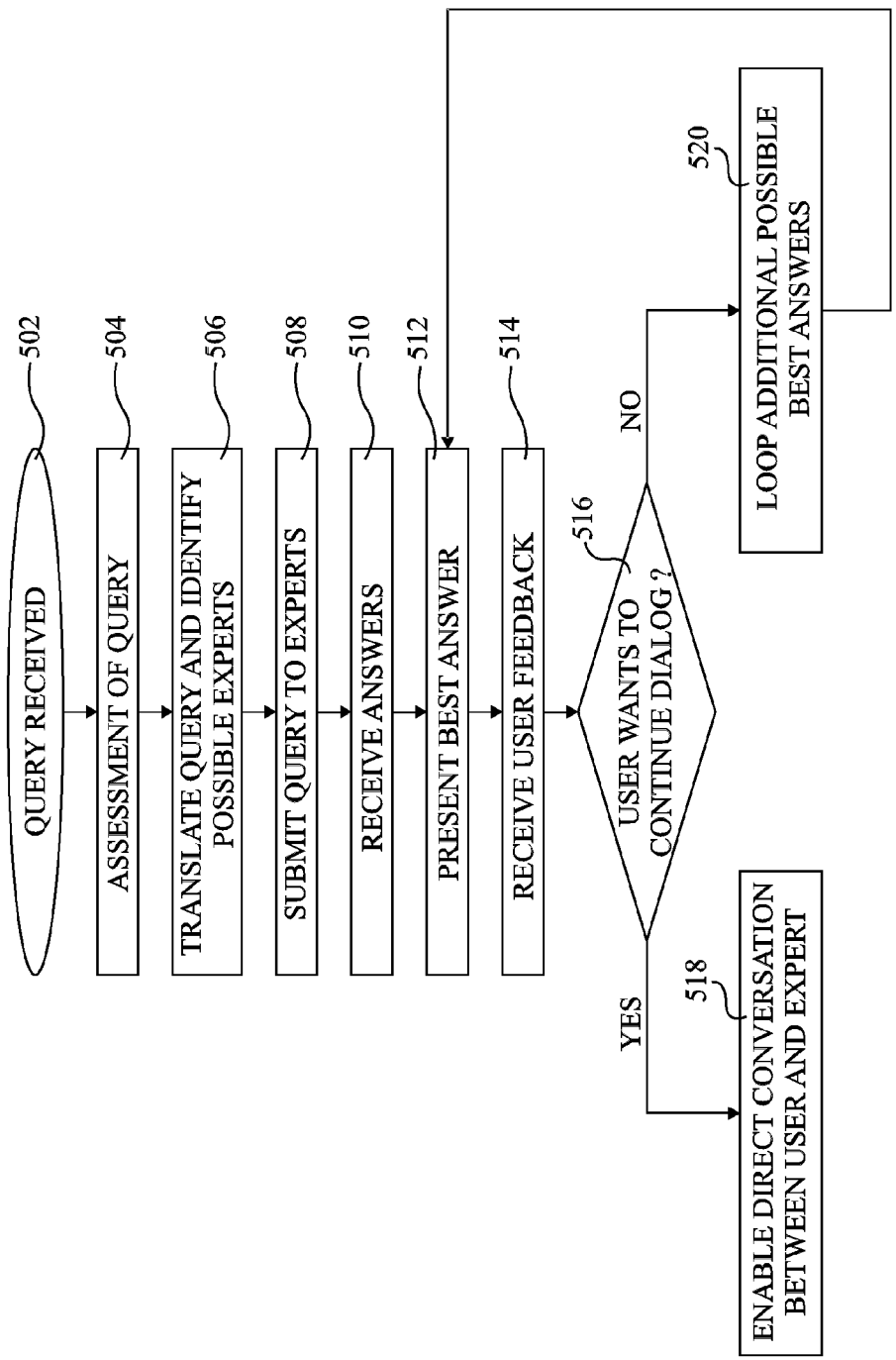

VIRTUAL ASSISTANT INTERACTIVITY PLATFORM

The present patent application is a national stage filing under 35 U.S.C. § 371 of PCT application number PCT/EP2014/076828, having an international filing date of Dec. 8, 2014, which claims priority from European patent application No. EP13306680.3, having a filing date of Dec. 9, 2013, the disclosures of which are hereby incorporated by reference in their entireties.

FIELD

The present disclosure relates to the field of methods and systems for providing automated responses to user queries, and in particular to a method and system for responding to user queries using virtual assistants.

BACKGROUND

Virtual assistants, also known as automated online assistants, are systems that use artificial intelligence to provide a dialog with a user in order to respond to user queries. For example, companies often make use of virtual assistants to provide a form of customer interface, allowing many types of customer queries to be resolved without human intervention.

The capacity of a virtual assistant to be able to respond to a client query, and the extent to which the response adequately resolves the query, will depend on the knowledge base and programmed competences of the virtual assistant. In particular, virtual assistants generally operate by applying programmed rules when responding to user queries. These rules determine the scope of queries that may be addressed by the virtual assistant, and the depth of the response that is provided.

To improve user satisfaction, there is a need in the art for virtual assistants capable of adequately handling a broader range of user queries. However, there are technical difficulties in meeting such a need without significantly increasing the processing and data storage resources of the virtual assistant. Additionally, an organization may want to make available a virtual assistant that has a knowledge base and programmed competences directed to products or services not directly produced by it. For instance, a retail sales company may want to provide a virtual assistant to answer questions regarding products it sells. However, maintaining such a virtual assistant can be costly and inefficient due to a constant need to update its knowledge base and programmed competences.

SUMMARY

It is an aim of embodiments of the present invention to at least partially address one or more needs in the prior art.

According to one aspect, there is provided a system comprising: a virtual assistant interactivity platform comprising: a processing device; a memory device storing data identifying a plurality of virtual assistants, and one or more topics associated with each virtual assistant; a communication interface configured to receive an input query from a user device; and a memory coupled to the processing device and storing executable instructions that, when executed by the processing device, cause the processing device to: assess the input query to identify a subset of at least one of the virtual assistants based on a comparison between at least one topic of the query and the one or more topics associated with each virtual assistant; transmit a query based on the input query to each of the virtual assistants of the subset; evaluate answers to the input query received from the virtual assistants of the subset in order to generate a response comprising one or more of the answers; and transmit the response to the user device.

According to one embodiment, the subset of at least one virtual assistant is identified by generating an expert score associated with each of the virtual assistants, and comparing each expert score with a threshold value.

According to one embodiment, the expert score is generated for a given virtual assistant based on respective topics detected in the query, an indication of the given virtual assistant's knowledge of each respective topic, and an indication of the importance of each respective topic among the topics in the query.

According to one embodiment, evaluating the answers to the input query received from the virtual assistants of the subset comprises determining an authority score associated with each virtual assistant that indicates a level of expertise of the virtual assistant, and determining a response score for each of the answers based on the authority score of each virtual assistant.

According to one embodiment, evaluating the answers to the input query received from the virtual assistants of the subset further comprises comparing at least some of the response scores with a response score threshold.

According to one embodiment, the response comprises each of the answers for which the response score is equal to or exceeds the response score threshold.

According to one embodiment, the response comprises a combination of multiple of the answers created using semantic analysis to identify differentiated subject matter in the multiple answers.

According to one embodiment, the virtual assistant interactivity platform comprises a virtual assistant dialog management module adapted to communicate with a query entry interface of the virtual assistants.

According to one embodiment, the virtual assistant interactivity platform comprises a translation module configured to translate the text forming the user query from a first language to a second language.

According to a further aspect, there is provided a method comprising: assessing, by a virtual assistant interactivity platform, an input query from a user device to identify a subset of at least one of a plurality of virtual assistants based on a comparison between at least one topic of the query and one or more topics associated with each virtual assistant; transmitting a query based on the input query to each of the virtual assistants of the subset; evaluating answers to the input query received from the virtual assistants of the subset in order to generate a response comprising one or more of the answers; and transmitting the response to the user device.

According to one embodiment, the subset of at least one virtual assistant is identified by generating an expert score associated with each of the virtual assistants, and comparing each expert score with a threshold value.

According to one embodiment, the expert score is generated for a given virtual assistant based on respective topics detected in the query, an indication of the given virtual assistant's knowledge of each respective topic, and an indication of the importance of each respective topic among the topics in the query.

According to one embodiment, evaluating the answers to the input query received from the virtual assistants of the subset comprises determining an authority score associated with each virtual assistant that indicates a level of expertise of the virtual assistant, and determining a response score for each of the answers based on the authority score of each virtual assistant.

According to one embodiment, evaluating the answers to the input query received from the virtual assistants of the subset further comprises comparing at least some of the response scores with a response score threshold.

According to one aspect, there is provided a non-transitory data storage device storing program instructions that, when executed by a processing device, cause the implementation of the above method.

BRIEF DESCRIPTION OF THE DRAWINGS

The foregoing and other features and advantages will become apparent from the following detailed description of embodiments, given by way of illustration and not limitation with reference to the accompanying drawings, in which:

FIG. 2B illustrates a virtual assistant of FIG. 1 in more detail according to an example embodiment;

FIG. 4 schematically represents functional modules forming the virtual assistant interactivity platform of FIG. 1 according to an example embodiment of the present disclosure;

FIG. 5 illustrates the method of FIG. 3 in more detail according to an example embodiment of the present disclosure;

FIG. 6 is a table showing an example of query analysis according to an example embodiment of the present disclosure.

DETAILED DESCRIPTION

Figure 1:
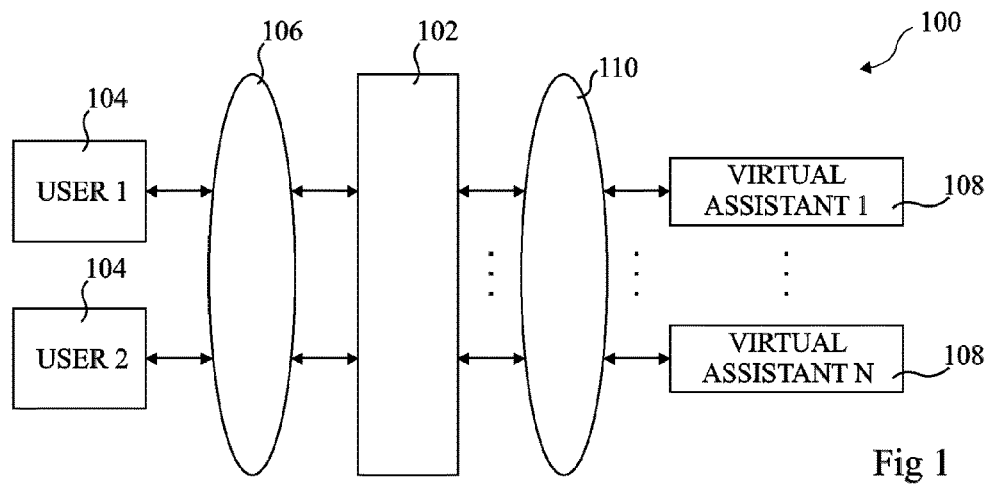
FIG. 1 schematically illustrates an automated user query response system according to an example embodiment.

FIG. 1 schematically illustrates an automated query response system 100 according to an example embodiment.

The system 100 comprises a virtual assistant interactivity platform 102. The platform 102 is capable of communication with one or more user devices 104, via one or more intermediate networks 106. FIG. 1 illustrates an example in which there are two user devices (USER 1 and USER 2), but in alternative embodiments there could be any number. Each user device 104 is for example a personal computer, portable device such as a laptop, smart phone, etc., or other device capable of electronic communications. The one or more intermediate networks 106 may comprise one or more packet switched networks such as the Internet, one or more LANs (local area networks) and/or wireless LANs and/or other types of networks.

The platform 102 is also in communication, via one or more intermediate networks 110, with N virtual assistants 108 (VIRTUAL ASSISTANT 1 to VIRTUAL ASSISTANT N). There is no limit to the number N of virtual assistants that could be addressed via platform 102, but in general, N is at least 2. As with the intermediate networks 106, the one or more intermediate networks 110 may also comprise one or more packet switched networks such as the Internet, one or more LANs (local area networks) and/or wireless LANs and/or other types of networks.

Each virtual assistant 108 corresponds to an automated response system, for example implemented on a server, capable of receiving and responding to user queries. For example, virtual assistants 108 may host an interface, such as a website that provides a query entry interface allowing queries expressed in text format to be submitted in dialog boxes, and responses, also in text format, to be returned. Virtual assistants 108 may be addressable via other interfaces as well, such as a representational state transfer (REST)-compliant web service using eXtensible Markup Language (XML) messages and the Simple Object Access Protocol (SOAP), or other framework offering similar interactivity. It will also be apparent to those skilled in the art that the input and/or output interfaces of the virtual assistants could comprise other data formats in addition to or instead of text, such as spoken language in the form of an audio stream and using appropriate speech-to-text and/or text-to-speech conversion.

As will be described in more detail below, in operation, a user submits an input query, via a user device 104, to the virtual assistant interactivity platform 102. For example, like the virtual assistants 108, the virtual assistant interactivity platform 102 hosts an interface, such as a website allowing queries expressed in text format to be submitted in dialog boxes, and responses, also in text format, to be returned. The virtual assistant interactivity platform 102 may have other interfaces as well such as REST-compliant web services. Also like the virtual assistants 108, the input and/or output interfaces of the virtual assistant interactivity platform 102 could comprise other data formats in addition to or instead of text, such as spoken language. The platform 102 interrogates a selection of one or more of the virtual assistants 108 based on the query, by forwarding at least part of the query to each of the selected virtual assistants 108. The response from at least one of the selected virtual assistants 108 is then forwarded to the user device 104 that submitted the input query.

While in the example embodiment of FIG. 1, the virtual assistant interactivity platform 102 communicates with the user device 104 and with the virtual assistants 108 via intermediate networks 106, 110, in alternative embodiments the platform 102 may be in direct communication with one of the user devices and/or a plurality of the virtual assistants 108, for example if they are implemented locally with the platform 102.

Figure 2A:
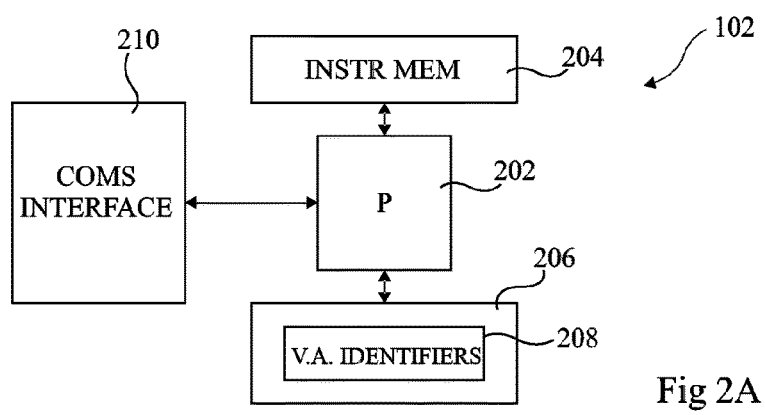
FIG. 2A illustrates a virtual assistant interactivity platform of FIG. 1 in more detail according to an example embodiment.

FIG. 2A illustrates an example of hardware implementing the virtual assistant interactivity platform 102 according to an example embodiment.

For example, the platform 102 comprises a processing device 202, which comprises one or more processors under the control of instructions stored in an instruction memory 204. The processing device 202 is also coupled to a memory 206 storing data, such as a list 208 of virtual assistant identifiers. For example the virtual assistants may each be identified by a URL (uniform resource locator) such as a web address. As will be described in more detail below, an authority level may also be associated with each virtual assistant. It should also be noted that the list 208 may be encapsulated in a database.

The processing device 202 is also coupled to a communications interface 210, which allows communications via one or more intermediate networks with other elements of the query response system, such as the user device 104 and virtual assistants 108.

FIG. 2B illustrates an example of hardware implementing each of the virtual assistants 108 according to an example embodiment.

For example, each virtual assistant 108 comprises a processing device 212, which comprises one or more processors under the control of instructions stored in an instruction memory 214. In particular, the instructions in the instruction memory 214 for example cause rules to be applied when processing user queries in order that a query response is generated. The processing device 212 is also coupled to a memory 216 storing data, such as a knowledge base 218 providing data for aiding the response to queries. As an example, data forming the knowledge base could include product specifications, help files, textual answers, multimedia contents (pictures, video), web links, etc.

The processing device 212 is also coupled to a communications interface 220, which allows communications, via one or more intermediate networks, with the virtual assistant interactivity platform 102.

Figure 3:
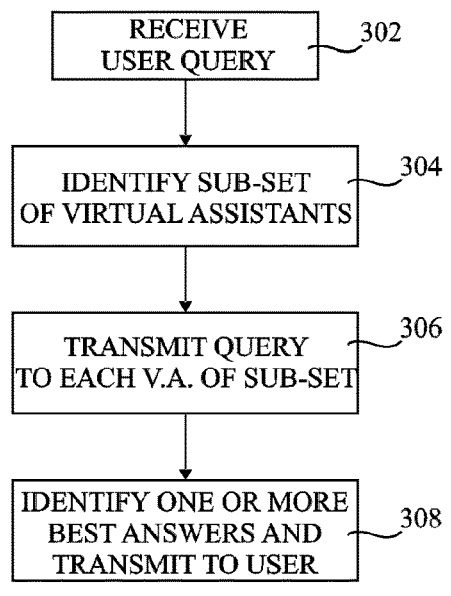
FIG. 3 is a flow diagram showing operations in a method of responding to a user query according to an example embodiment of the present disclosure.

FIG. 3 is a flow diagram illustrating operations in a method, implemented by the virtual assistant interactivity platform 102 of FIG. 1, for automatically responding to a user query according to an example embodiment. This method is for example implemented by program instructions stored in the instruction memory 204 of FIG. 2A.

In a first operation 302, the virtual assistant interactivity platform 102 receives a user input query from one of the user devices 104.

In a subsequent operation 304, the virtual assistant interactivity platform 102 identifies a subset of virtual assistants based on the user query. The subset for example comprises one or more virtual assistants. For example, the virtual assistant interactivity platform 102 extracts one or more topics from the user query, and compares these one or more extracted topics with topics handled by each of the virtual assistants 108. A filtering operation is then for example used to filter out one or more of the virtual assistants that are not capable of responding to queries relating to some or all of the extracted topics, or that have a relatively low expertise in relation to some or all of the extracted topics. The remaining virtual assistants form the subset of selected virtual assistants to which the query will be transmitted.

In a subsequent operation 306, at least part of the query is transmitted to each virtual assistant of the subset. For example, this involves transmitting all or some of the text forming the query to each identified virtual assistant in the subset, for example by entering the text into a dialog box of a web interface associated with each virtual assistant, or by formulating a SOAP message containing the appropriate querying information and transmitting that message to the web services interface of that virtual assistant.

In a subsequent operation 308, responses are received from the virtual assistants, and one or more best answers to the query are identified and transmitted to the user device 104 from which the query initiated. In particular, the virtual assistant interactivity platform 102 is for example capable of identifying cases in which a virtual assistant was unable to provide a useful response, for example by detecting standard wording such as "your query has not been understood". Such responses may be discarded. If there is more than one remaining answer, the system is for example capable of ranking the answers based on characteristics of the virtual assistant from which each response is received. These characteristics include for example a measure of the relevance of the topic for the virtual assistant and/or an authority score associated with the virtual assistant.

The authority score of each virtual assistant is for example determined periodically based on factors such as the size and/or customer base of the company, the general level of expertise of the company as perceived by their customers, etc.

The measures of the relevance of a range of topics for each virtual assistant for example represent pre-programmed parameters in the system. Alternatively or additionally, machine learning can be used to determine/modify the topic-based competence of each virtual assistant by using a feedback loop to assess whether or not users find responses from the virtual assistants on one or more given topics to be of use.

One or more of the best answers are then transmitted to the user device 104. For example, a single best answer could be transmitted, and then the user could be offered the chance of seeing other answers if they wish, or all of the answers may be transmitted to the user device 104. In an alternative embodiment, the subject matter of multiple best answers may be combined into a single answer for presentation to the user, for instance, by using semantic analysis to identify differentiated subject matter in the best answers. In this manner the knowledge of multiple virtual assistants can be simultaneously presented to a user, without duplicate presentation of subject matter.

FIG. 4 schematically illustrates an example of functional modules forming the virtual assistant interactivity platform 102 according to an example embodiment. Each of these modules is for example implemented by a program stored in the instruction memory 204 of FIG. 2A.

The virtual assistant interactivity platform 102 for example comprises a user dialog management module 402, which provides an interface with user devices 104. For example, the module 402 provides a web interface, accessible via the Internet, with a dialog box via which users may enter queries and responses may be provided. The virtual assistant interactivity platform 102 is for example capable of processing a plurality of user queries in parallel.

The platform 102 also comprises a query analysis module 404, which is capable of analysing user queries and identifying a subset of the virtual assistants 108 that may be able to assist in responding to the query.

The platform 102 also comprises a query routing module 406, which is capable of routing user queries to the subsets of identified virtual assistants 108. Furthermore, the platform 102 comprises a virtual assistant dialog management module 408 via which queries are routed to identified virtual assistants. In particular, the module 408 is for example capable of establishing and maintaining a dialog with each virtual assistant 108 forming the identified subset.

The platform 102 may also comprises a translation module 410, which is capable of translating the text forming a user query and/or one or more of the responses received from the virtual assistants 108 from one language to another, to aid communication. For example, a user submitting an input query may type the query in French, and while some of the identified subset of virtual assistants may accept French as a language of interrogation, others may accept only English, and so the translation module 410 provides appropriate French to English and English to French translation.

The platform 102 also comprises a response transformation module 412, which is adapted to receive responses from one or more virtual assistants 108, and to transform the responses, for example by filtering out and/or merging some of the answers, in order to generate the response to be provided to the user device.

FIG. 5 is a flow diagram showing operations in the method of FIG. 3 in more detail according to an example embodiment.

A query is received in an operation 502, and in a subsequent operation 504 the query is assessed. This for example involves identifying one or more topics of the query, and ranking the topics based on their deemed importance, as will now be described with reference to FIG. 6.

FIG. 6 is a table illustrating an example of the ranking of terms in a user query. In the example of FIG. 6, the user query is the phrase "I am looking for new xyz phone colors", where xyz is a phone brand. This query forms a top row 602 of the table, with each word corresponding to a separate column. As shown by a middle row 604 of the table, each word is for example indexed 0 to 7 in the order that the words occur in the query. Each of the words for example corresponds to separate topic of the query, and as shown in the bottom row 606 of the table, a ranking may be applied to the words based on their deemed importance to the context of the query.

In the example of FIG. 6, the highest ranking word is for example the word "xyz", which is the name of the brand of phone that is concerned. Indeed, one or more of the virtual assistants 108 may be provided on website associated with given brands, and thus a brand name detected in a query may systematically be considered the highest ranking topic. The word "phone" is for example given the second highest importance, as this word identifies a class of product concerned by the query, and the word "colors" is for example given the third highest importance as this team indicates the type of information that is requested regarding the product.

The other words are given lower importance, and in some cases certain words such as "I" and "am" could be automatically filtered from the query during the assessment phase as not adding useful information to the query.

In a subsequent operation 506, the query is for example translated, and one or more experts, in other words one or more of the virtual assistants having an expertise in the given topics, are identified. For example, in some embodiments, experts may be identified by determining an expert score $Score_{VA}$ of each virtual assistant using the following formula:

$$Score_{VA} = \sum_{topic\_0}^{topic\_k} topic\_weight \times Im$$

where the topics topic_0 to topic_k correspond to the identified topics of the query indexed 0 to k, the topic_weight corresponds to the weighting associated with a topic for the given virtual assistant, and Im is the importance of the topic among the topics identified in the query. Thus, virtual assistants associated with a high weighting for a given topic, which is also an important topic of the query, will receive a high expert score.

An expert score determined based on the above formula is for example determined for each of the N virtual assistants 108. A selection of a subset of virtual assistants is then made based on these scores. For example, the selection could be made by comparing each score with a threshold value, the subset of virtual assistants corresponding to those for which the threshold is exceeded. Alternatively or additionally, a certain number of the highest scoring virtual assistants are selected to form the subset. For example, in some embodiments, the subset comprises all of the virtual assistants for which the expert score exceeds a threshold value, unless the number of such virtual assistants exceeds a limit L, for example equal to a value between 10 and 50, in which case the L highest scoring virtual assistants are selected to form the subset.

In a subsequent operation 508, the query is submitted to the identified virtual assistants forming the subset. For example, this involves transmitting the complete text of the query to each expert. Alternatively, in some embodiments, certain words of the query may be suppressed, such as words that are deemed to be of low significance.

In a subsequent operation 510, responses are received from at least some of the subset of virtual assistants. This operation for example involves setting a time delay, for example of between 2 and 30 seconds, and if any virtual assistant has not responded within this time delay, it may be assumed that this virtual assistant is not available, and processing continues based only on the responses from the other virtual assistants. If a virtual assistant is consistently unavailable, platform 102 may be operable to exclude that virtual assistant from querying for a period of time, so as to not induce delay in providing responses to users.

In a subsequent operation 512, one or more of the best answers provided by the virtual assistants are presented to the user device 104. The selection of best answers is described in more detail with reference to FIG. 7.

In a subsequent operation 514, user feedback is received from the user device 104. For example, the user may be prompted to indicate, via a user interface of the user device, whether one or more of the best answers adequately responds to the query. This feedback can be analysed to determine which virtual assistants are capable of providing useful responses to queries of given topics.

In a subsequent operation 516, the user is for example prompted to indicate whether she/he wishes to continue dialog with the virtual assistant that provided the best answer. If so, in a subsequent operation 518, the virtual assistant interactivity platform 102 for example enables conversation between the user device 104 and the virtual assistant. In particular, the platform 102 for example routes each input from the user device 104 to the designated virtual assistant 108, and routes each response back to this user device 104.

Alternatively, if in operation 516 the user does not wish to continue the dialog, the next operation is for example operation 520, in which an additional loop is for example used to provide further best answer in the case that the user was not adequately satisfied with the best response transmitted in operation 512, and/or if the user indicates a desire to view the answers from one or more other virtual assistants.

Figure 7:
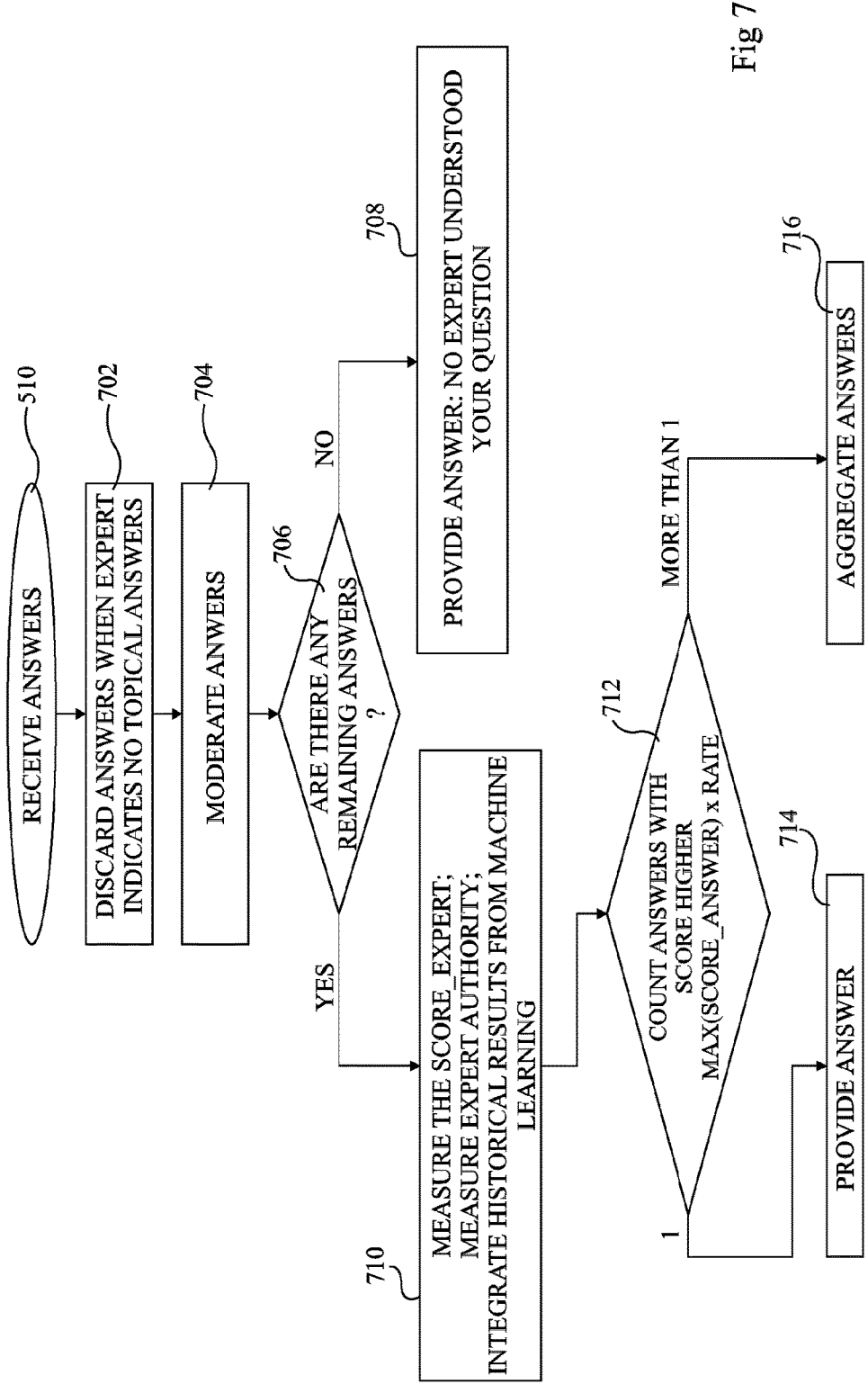
FIG. 7 is a flow diagram showing operations in a method of determining a best answer according to an example embodiment of the present disclosure.

FIG. 7 is a flow diagram illustrating operations performed in generating a best answer in the operation 512 of FIG. 5 in more detail according to an example embodiment.

Once answers have been received from at least some of the subset of virtual assistants in operation 510 of FIG. 5, an operation 702 of FIG. 7 is performed, in which any answers are discarded when the virtual assistant indicates a phrase such as "No topical answers", implying that the expert was unable to answer the query.

In a subsequent operation 704, the answers from the subset of virtual assistants are moderated. For example, this may involve filtering out certain aspects of the responses from virtual assistants, such as marketing material.

In a subsequent operation 706, it is determined whether there are any remaining answers after the two filtering operations of 702 and 704 have been applied. If not, in a subsequent operation 708, it is indicated to the user that "No expert understood your question", or a similar phrase to inform the user that none of the virtual assistants was able to respond to the query.

Alternatively, if in operation 706 there is at least one answer, the next operation is 710, in which an expert score and authority score associated with each virtual assistant is determined, along with a history score for each virtual assistant determined based on historical results obtained by machine learning. These parameters are then used to generate a response score associated with the query response from each virtual assistant. For example, in one embodiment the response score is the sum of the expert score, the authority score, and history score. In alternative embodiments, different formulas could be used to generate the response scores.

In a subsequent operation 712, it is determined how many of the response scores are equal to or exceed a response score threshold. Thus threshold is for example the highest score among the response scores, multiplied by a rate R. This rate R is for example a parameter, in the range 0.1 to 1, set by the client indicating a willingness to accept several answers rather than a single answer. For example, if the rate is set to a value of 0.5, this will mean that any answer that scores more than 50% of the highest response score will be counted. Alternatively, if the rate is set at 1, only the highest response score will be counted.

If in operation 712 it is determined that there is a single answer, this answer is transmitted to the user device in operation 714. Alternatively, if in operation 712 it is determined that there is more than one answer, the answers are aggregated and transmitted to the user device in operation 716. For example, this may simply involve entering each answer in the dialog box of the user device 104, and inviting the user to indicate which answer is found to respond best to their query.

An advantage of the embodiments described herein is that, by providing a virtual assistant interactivity platform capable of communicating with a plurality of virtual assistants and of identifying a subset of the virtual assistants to be interrogated with the query, an automated response system can be provided that is capable of responding to a broad range of user queries. A further advantage is that, by selecting a subset of the virtual assistants, the number of assistants to be interrogated, and the number of received responses, will be reduced when compared to a case in which all virtual assistants are interrogated. This leads the technical advantage of reducing processing requirements and energy consumption in the system.

Furthermore, by relying on multiple virtual assistants, each dedicated to specific areas of expertise, and filtering between answers provided by these virtual assistants, the behaviour of the platform may mimic closely that of a virtual assistant capable of responding to a broader range of requests than a single virtual assistant.

Having thus described at least one illustrative embodiment, various alterations, modifications and improvements will readily occur to those skilled in the art.

For example, it will be apparent to those skilled in the art that while software implementations have been described, alternatively the embodiments described herein could be implemented at least partially in hardware, such as by one or more ASICs (application specific integrated circuits).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal (i.e. it is non-transitory), a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:
1. A system comprising:
a virtual assistant interactivity platform comprising:
a processing device;
a memory device storing data identifying virtual assistants, and one or more topics associated with each of the virtual assistants, wherein the virtual assistants are automated online assistants;
a communication interface to receive an input query from a user device; and a memory coupled to the processing device and storing executable instructions that, when executed by the processing device, cause the processing device to:

assess the input query to identify a subset of the virtual assistants based on a comparison between at least one topic in the input query and the one or more topics associated with each virtual assistant of the virtual assistants, the subset being a plurality of virtual assistants identified based upon a comparison of a threshold value with an expert score associated with each virtual assistant and the at least one topic, wherein the expert score associated with each virtual assistant is generated based on the at least one topic in the input query, and at least one of an indication of each virtual assistant's knowledge of each respective topic of the at least one topic in the input query and an indication of an importance of each respective topic of the at least one topic in the input query;

transmit a query based on the input query to each of the virtual assistants of the subset;

receive a response to the transmitted query from each of the virtual assistants of the subset; and transmit the response to the user device.

2. The system of any of claim 1, wherein to transmit the response to the user, the processing device is to select the response from the virtual assistants of the subset by determining an authority score associated with each of the virtual assistants, the authority score indicating a level of expertise of each of the virtual assistants, and determining a response score for each of the responses based on the authority score associated with each of the virtual assistants.

3. The system of claim 2, wherein to transmit the response, the processing device is to compare the response score from each of the virtual assistants of the subset with a response score threshold.

4. The system of claim 3, wherein to transmit the response to the user device, the processing device is to transmit the responses for which the response score is equal to or exceeds the response score threshold.

5. The system of claim 3, wherein to transmit the response to the user device, the processing device is to combine responses using semantic analysis to identify differentiated subject matter in the received responses.

6. The system of claim 1, wherein said virtual assistant interactivity platform comprises a virtual assistant dialog management module adapted to communicate with a query entry interface of said virtual assistants.

7. The system of claim 1, wherein said virtual assistant interactivity platform comprises a translation module to translate the text forming the input query from a first language to a second language.

8. A method comprising:

assessing, by a virtual assistant interactivity platform, an input query from a user device to identify a subset of virtual assistants based on a comparison between at least one topic efin the input query and one or more topics associated with each virtual assistant, wherein the subset comprises a plurality of the virtual assistants, the plurality of virtual assistants being identified by generating an expert score associated with each of the virtual assistants, and comparing each expert score with a threshold value, wherein the expert score associated with each of the virtual assistants is generated based on each respective topic of the at least one topic in the input query, and at least one of an indication of each virtual assistant's knowledge of each respective topic and an indication of an importance of each respective topic of the at least one topic in the input query;

transmitting a query based on the input query to each of the virtual assistants of the subset;

evaluating answers to the transmitted query received from the virtual assistants of the subset;

generating a response comprising one or more of the answers; and transmitting the response to the user device.

9. The method of claim 8, wherein evaluating the answers to the input query received from the virtual assistants of the subset comprises determining an authority score associated with each virtual assistant that indicates a level of expertise of the virtual assistant, and determining a response score for each of said answers based on the authority score of each virtual assistant.

10. The method of claim 9, wherein evaluating the answers to the input query received from the virtual assistants of the subset further comprises comparing at least some of the response scores with a response score threshold.

11. A non-transitory data storage device storing program instructions that, when executed by a processing device, cause the processing device to:

assess, by a virtual assistant interactivity platform, an input query from a user device to identify a subset of virtual assistants based on a comparison between at least one topic in the input query and one or more topics associated with each virtual assistant, wherein the subset comprises a plurality of the virtual assistants, the plurality of virtual assistants being identified by generating an expert score associated with each of the virtual assistants, and comparing each expert score with a threshold value, wherein the expert score associated with each of the virtual assistants is generated based on each respective topic of the at least one topic in the input query, and at least one of an indication of each virtual assistant's knowledge of each respective topic and an indication of an importance of each respective topic of the at least one topic in the input query;

transmit a query based on the input query to each of the virtual assistants of the subset;

evaluate answers to the transmitted query received from the virtual assistants of the subset;

generate a response comprising one or more of the answers; and transmit the response to the user device.

* * * * *

UNITED STATES PATENT AND TRADEMARK OFFICE
CERTIFICATE OF CORRECTION

PATENT NO. : 10,353,906 B2
APPLICATION NO. : 15/101760
DATED : July 16, 2019
INVENTOR(S) : Christian Souche et al.

Page 1 of 1

It is certified that error appears in the above-identified patent and that said Letters Patent is hereby corrected as shown below:

On the Title Page

At Item (30), Foreign Application Priority Data "13306680" should be "13306680.3".

At Item (63), Related U.S. Application Data should be removed. The priority should to PCT application PCT/EP2014/076828 should be as a 371 application, which is already correctly shown in Items (86) and (22).

In the Claims

In Column 13, Line 56, Claim 8, "efin" should read "in".

Signed and Sealed this
Third Day of September, 2019

Andrei Iancu
*Director of the United States Patent and Trademark Office*